No. 787,859. Patented April 18, 1905.

UNITED STATES PATENT OFFICE.

ROLAND HEINRICH SCHOLL, OF KARLSRUHE, AND OSCAR BALLY, OF MANNHEIM, GERMANY, ASSIGNORS TO BADISCHE ANILIN & SODA FABRIK, OF LUDWIGSHAFEN-ON-THE-RHINE, GERMANY, A CORPORATION OF BADEN.

ANTHRACENE COMPOUND AND PROCESS OF MAKING SAME.

SPECIFICATION forming part of Letters Patent No. 787,859, dated April 18, 1905.

Application filed January 7, 1905. Serial No. 240,099.

*To all whom it may concern:*

Be it known that we, ROLAND HEINRICH SCHOLL, professor of chemistry and doctor of philosophy, a subject of the King of Bavaria and of the Grand Duke of Baden, residing at Karlsruhe, and OSCAR BALLY, doctor of philosophy and chemist, a citizen of the Swiss Republic, residing at Mannheim, in the Grand Duchy of Baden, Germany, have invented new and useful Improvements in new Anthracene Compounds and Processes for Producing the Same, of which the following is a specification.

Our invention relates to the production of new products of the anthracene series which are of use for the preparation of new coloring-matters.

In the specification of the application for Letters Patent Serial No. 233,161, filed November 17, 1904, is described the production of new products of the anthracene series by condensing a beta-amido-anthraquinone or a sulfo-acid of a beta-amido-anthraquinone with glycerin in the presence of sulfuric acid.

We have now discovered that many anthracene compounds which do not contain nitrogen can be condensed with glycerin, yielding compounds which may be regarded as derivatives of a parent substance, which we call "benzanthrone" and which possesses a composition corresponding to the following structural formula:

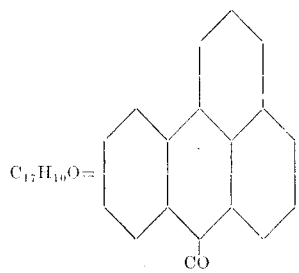

The anthracene compounds which can be used according to our invention include anthracene itself, its meso-oxy and hydroxy derivatives, and also the sulfo-acids of any of these compounds. As examples, we mention the following compounds: anthraquinone, anthranol, oxanthranol, the anthracene sulfo-acids, and anthraquinone sulfo-acids. Of course instead of anthracene its homologues may be employed. The condensation generally takes place on heating together the anthracene body and the glycerin; but in most cases the presence of sulfuric acid or of another body or bodies which may assist in the condensation is advisable. After the condensation the melt is poured into water or ice and water, whereupon the products obtained from the unsulfonated compounds are generally precipitated, whereas those obtained from the sulfonated anthracene compounds are more soluble in water, but can be precipitated by the addition of common salt to the solution. These condensation products on being melted with caustic alkali yield violet-blue coloring-matters possessing general characteristics similar to those of indanthrene—that is to say, they cannot be used directly for dyeing, because they are insoluble in water—but on treatment with an alkaline reducing agent—for instance, alkaline hydrosulfite—they yield soluble leuco compounds which dye vegetable fiber shades which on washing with water become fixed, being reconverted into the insoluble coloring-matter. The condensation products are all characterized by their solubility in concentrated sulfuric acid, in which they yield from orange to green solutions with green to red fluorescence.

The following examples will serve to further illustrate the nature of our invention, which, however, is not limited to these examples. The parts are by weight.

Example 1: Introduce one (1) part of anthracene (containing about ninety-eight (98) per cent. of the pure compound) into thirty (30) parts of sulfuric acid (containing about eighty-two (82) per cent. of $H_2S_4O$) and add two (2) parts of glycerin. Heat this mixture slowly to a temperature of from one hundred to one hundred and ten degrees centigrade (100°–110°C.) and maintain this temperature until all the anthracene has gone into solution. Allow the mixture to cool, pour into water, add common salt, and filter off the condensation product, which when dry is a gray-green powder consisting, chiefly, of one part soluble in water and another part insoluble in water. This latter on being crystallized from alcohol can be obtained in the form of yellow needles, melting at a temperature of one hundred and seventy degrees centigrade (170°C.) and is the aforementioned compound, to which we have given the name "benzanthrone." It dissolves in concentrated sulfuric acid, giving an orange-red solution with a fluorescence of the same color. On being melted with caustic alkali it yields a coloring-matter insoluble in water, which, however, dissolves in alkaline hydrosulfite solution, yielding a vat which dyes vegetable fiber violet. The part of the raw product which is soluble in water also dissolves in concentrated sulfuric acid, giving an orange-red solution with a fluorescence of the same color. On melting with caustic alkali it gives rise to a coloring-matter similar to that obtained from the part insoluble in water. Instead of anthracene in this example derivatives—such, for example, as the anthracene sulfo-acids—or homologues—for example, methylanthracene—can be successfully substituted.

Example 2: Suspend ten (10) parts of anthranol prepared according to the method of Liebermann and Gimbel (*Berichte*, Vol. XX, page 1854) in one hundred and fifty (150) parts of sulfuric acid (containing about eighty-two (82) per cent. of $H_2SO_4$) and add ten (10) parts of glycerin. Warm this mixture carefully to a temperature of about one hundred and twenty degrees centigrades (120° C.) It begins to turn red, a fairly violent reaction sets in, and sulfur dioxid is evolved. When the reaction is ended, allow the melt to cool and then pour it into water, whereupon the reaction product separates out in olive-green flakes. Filter these off and wash, press, and dry. The dried unpurified condensation product is a light olive-green powder insoluble in dilute acids and alkalies. Concentrated sulfuric acid dissolves it, the solution being reddish brown with an intense orange-colored fluorescence. The greater part of it is soluble in alcohol and crystallizes out of this solution in slender light-yellow needles, which melt at a temperature of one hundred and seventy degrees centigrade, (170° C.) This is the same compound as that to which we have given the name "benzanthrone," (of the preceding example 1.) These needles dissolve in concentrated sulfuric acid, the solution being brilliant orange red with a similar fluorescence. On melting these needles with caustic alkali an insoluble dyestuff is obtained which when reduced dies vegetable fiber violet. A similar product, which contains the above-mentioned compound, melting at a temperature of one hundred and seventy degrees centigrade (170° C.) is obtained when oxanthranol is treated in a similar manner, while anthranol sulfo-acid yields a condensation product which is soluble in water, but which otherwise possesses similar properties.

Example 3: Thoroughly mix together one (1) part of anthranol, twenty (20) parts of glycerin, and five (5) parts of zinc chlorid and heat the mixture to a temperature of from two hundred and ten to two hundred and twenty degrees centigrade, (210°–220° C.) After a short time a test portion worked up with water and dissolved in concentrated sulfuric acid shows the orange color and fluorescence characteristic of benzanthrone. When the reaction is complete, treat with hot water to remove the excess of glycerin and zinc chlorid and then purify the residue by means of crystallization. In this way benzanthrone is obtained.

Example 4: Dissolve ten (10) parts of the sodium salt of anthraquinone-beta-mono-sulfo-acid in one hundred and fifty (150) parts of sulfuric acid, (containing about eighty-two (82) per cent. of $H_2SO_4$.) Add twenty (20) parts of glycerin and warm carefully to a temperature of from one hundred and forty to one hundred and fifty degrees centigrade, (140°–150° C.) When the reaction is ended, allow the melt to cool, pour it into water, and salt out by means of common salt the condensation product which is soluble in water. The unpurified product is a dark powder which is fairly easily soluble in hot water, the solution being a pale olive brown which scarcely changes on the addition of alkali. The solution in concentrated sulfuric acid is orange brown and shows a strong green fluorescence. This condensation product on being melted with caustic potash also yields a dyestuff which after reduction dyes vegetable fiber violet.

Example 5: Heat together for a few hours in an autoclave at a temperature of about one hundred and fifty degrees centigrade (150° C.) one (1) part of anthranol sulfo-acid, (prepared by reducing anthraquinone-beta-mono-sulfo-acid with tin and hydrochloric acid,) two (2) parts of glycerin, and five (5) parts of fuming hydrochloric acid. After the melt has cooled dissolve in water, filter, and precipitate the benzanthrone sulfo-acid from the filtrate by means of common salt. The product so obtained possesses properties similar to those of the product obtained according to the foregoing example 4. Anthraquinone itself also yields similar condensation products, although the reaction does not proceed so easily. It can, however, be assisted by adding to the melt a reducing agent—such, for instance, as iron, iron sulfate, zinc, tin, or anilin sulfate.

Example 6: Suspend ten (10) parts of anthraquinone in four hundred (400) parts of sulfuric acid (containing about eighty-two (82) per cent. of $H_2SO_4$) and add twenty (20) parts of glycerin and twenty (20) parts of anilin sulfate. Heat the mixture carefully to a temperature of from one hundred and thirty to one hundred and forty degrees centigrade (130°–140° C.) and maintain this temperature until the reaction mixture has assumed a uniform brown-red color. Allow the melt to cool and pour it into water and work it up, which may be done after the usual manner of performing such operations. The condensation product obtained has the same appearance and possesses the same properties as that obtained according to the preceding example 2.

What we claim is—

1. The process for the production of new anthracene compounds called benzanthrones by condensing a hereinbefore defined anthracene body free from nitrogen with glycerin.

2. The process for the production of new anthracene compounds called benzanthrones by condensing a hereinbefore-defined anthracene body free from nitrogen with glycerin in the presence of sulfuric acid.

3. The process for the production of new anthracene compounds called benzanthrones by condensing oxanthranol with glycerin.

4. The process for the production of new anthracene compounds called benzanthrones by condensing oxanthranol with glycerin in the presence of sulfuric acid.

5. As new articles of manufacture the anthracene compounds called benzanthrones such as can be obtained by condensing a hereinbefore-defined anthracene body with glycerin, which compounds dissolve in concentrated sulfuric acid yielding from orange to green solutions with green to red fluorescence, and which on melting with caustic alkali yield violet-blue coloring-matters which from an alkaline-hydrosulfite vat dye vegetable fiber substantively.

6. As a new article of manufacture the anthracene compound called benzanthrone such as can be obtained by condensing oxanthranol with glycerin, which compound dissolves in concentrated sulfuric acid giving an orange-red solution with an orange-red fluorescence, which is insoluble in water, and which on melting with caustic alkali yields a violet-blue coloring-matter which from an alkaline-hydrosulfite vat dyes vegetable fiber substantively.

In testimony whereof we have hereunto set our hands in the presence of two subscribing witnesses.

ROLAND HEINRICH SCHOLL.
OSCAR BALLY.

Witnesses:
ERNEST F. EHRHARDT,
JOS. H. LEUTE.